United States Patent

Chamouard et al.

[11] Patent Number: 5,883,593
[45] Date of Patent: Mar. 16, 1999

[54] METHOD FOR THE CALIBRATION OF THE POSITIONING ERRORS OF A RADAR AND THE DRIFT IN GROUND SPEED OF AN INERTIAL UNIT ON BOARD AN AIRCRAFT

[75] Inventors: Eric Chamouard, Le Mesnil St Denis; Boris Fronteau, Montigny le Bretonneux; Brice Monod, Issy les Moulineaux, all of France

[73] Assignee: Thomson-CSF, Paris, France

[21] Appl. No.: 879,443

[22] Filed: Jun. 20, 1997

[30] Foreign Application Priority Data

Jun. 21, 1996 [FR] France ................................. 96 07754

[51] Int. Cl.$^6$ ................................................ G01S 7/40
[52] U.S. Cl. .............................................................. 342/174
[58] Field of Search ............................... 342/174, 77, 81, 342/159

[56] References Cited

U.S. PATENT DOCUMENTS

| | | | |
|---|---|---|---|
| 3,761,926 | 9/1973 | Berger | 342/113 |
| 3,786,505 | 1/1974 | Rennie | 342/33 |
| 4,106,731 | 8/1978 | Bliss | 244/188 |
| 4,212,443 | 7/1980 | Duncan et al. | 244/177 |
| 4,405,986 | 9/1983 | Gray | 364/434 |
| 5,225,839 | 7/1993 | Okurowski et al. | 342/174 |

FOREIGN PATENT DOCUMENTS 2 244 405  11/1991  United Kingdom .

OTHER PUBLICATIONS

Proceedings of the National Aerospace and Electronics Conference (NAECON), Dayton, May 22–26, 1989, vol. 4 of 4, 22 May 1989, Institute of Electrical and Electronics Engineers, pp. 1753–1757, Daniel O. Molnar, et al., "B–1B Doppler Error Compensation Based On Flight Data Analysis".

*Primary Examiner*—John B. Sotomayor
*Attorney, Agent, or Firm*—Oblon, Spivak, McClelland, Maier & Neustadt, P.C.

[57] ABSTRACT

A method of calibration includes obtaining an estimation of the ground speed of an aircraft by an inertial unit $\vec{V}_{inertial}$ and by a radar $\vec{V}_{radar}$ in at least two different flight orientations and in using these estimations to determine the drift in speed $\vec{B}$ and a rotation matrix R corresponding to positioning errors of the radar with respect to inertial unit on the basis of the matrix relationship:

$$\vec{V}_{inertial} = R\vec{V}_{radar} + \vec{B}$$

applied for each of the flight orientations. The ground speed and ground speed drift vectors are expressed by their x, y and z components in a referential system related to the aircraft, and the matrix of rotation R being defined on the basis of the angles of positioning error in terms of yaw $\phi$, attitude $\theta$ and roll $\psi$ by the relationship:

$$R = \begin{pmatrix} 1 & -\phi & -\theta \\ \phi & 1 & -\psi \\ \theta & \psi & 1 \end{pmatrix}$$

5 Claims, 1 Drawing Sheet

… … …

METHOD FOR THE CALIBRATION OF THE POSITIONING ERRORS OF A RADAR AND THE DRIFT IN GROUND SPEED OF AN INERTIAL UNIT ON BOARD AN AIRCRAFT

BACKGROUND OF THE INVENTION

1. Field of the Invention

The present invention relates to the estimation of the positioning errors of a nose cone radar and the drift in ground speed of an inertial unit with which an aircraft is equipped.

The matching of the referential system of an inertial unit to that of a radar (hereinafter called referential matching) is a matter of critical importance. For, in addition to the errors of the radar itself in its reference system, there are the errors pertaining to the conversion of these measurements into the reference system of the inertial unit. This is very critically important for the angular measurements of the radar.

To minimize the errors of positioning between the radar and the inertial unit of an aircraft, it is the common practice to use a method of calibration on the ground known as harmonization which is done by means of test patterns and an optical sighting system. This method of harmonization consists in matching the referential systems of the inertial unit and the radar as precisely as possible with respect to a reference trihedron linked to the aircraft.

This procedure of harmonization is lengthy and difficult to implement. Furthermore, it does not take account of the deformations of the structure of the aircraft in flight.

The correction of the drift in ground speed of the inertial unit is done by a periodic rematching by comparison between the position estimated by the inertial unit and the true position deduced from the passage of the aircraft through reference points having precisely known coordinates or by any other system of location such as a satellite navigation system.

SUMMARY OF THE INVENTION

The present invention is aimed at a calibration of the errors of positioning between a radar and an inertial unit as well as of the drift in ground speed of the inertial unit based on the comparisons between the ground speed estimated by the inertial unit and the ground speed estimated by the radar in different flight orientations.

It is also aimed at a calibration of the errors of positioning between a radar and an inertial unit, that does not necessitate any optical sighting as a method of harmonization on the ground and is easy to implement at the beginning of a mission.

An object of the invention is a method for the calibration of the positioning errors of a radar and of the drift in ground speed of an inertial unit on board an aircraft, wherein said method consists in obtaining an estimation of the ground speed of the aircraft by the inertial unit $\vec{V}_{inertial}$ and by the radar $\vec{V}_{radar}$ in at least two different flight orientations and in using these estimations to determine the drift in speed $\vec{B}$ and a rotation matrix R corresponding to the positioning errors of the radar with respect to the inertial unit on the basis of the matrix relationship:

$$\vec{V}_{inertial} = R\vec{V}_{radar} + \vec{B}$$

applied for each of the flight orientations, the ground speed and ground speed drift vectors being expressed by their x, y and z components in a referential system related to the aircraft, and the matrix of rotation R being defined on the basis of the angles of positioning error in terms of yaw $\phi$, attitude $\theta$ and roll $\psi$ with respect to this referential system by the relationship:

$$R = \begin{pmatrix} 1 & -\phi & -\theta \\ \phi & 1 & -\psi \\ \theta & \psi & 1 \end{pmatrix}$$

Advantageously the two different flight orientations are obtained by means of a maneuver of the aircraft implying a change in both course and attitude.

Advantageously, it is possible to carry out several successive operations to determine the drift in ground speed of the inertial unit and of the positioning errors of the radar with respect to the inertial unit by performing successive maneuvers with the aircraft and to take the average of the values determined, if necessary by taking account of the reliability of the estimations of speed delivered, when reliability of this kind is known, on the basis of the measurements of noise observed.

BRIEF DESCRIPTION OF THE DRAWINGS

Other features and advantages of the invention shall appear from the following description of an embodiment given by way of an example. This description shall be made with reference to the appended drawings of which.

MORE DETAILED DESCRIPTION

The radar of an aircraft, in the mode of determination of the ground speed vector, carries out sightings of the ground at low incidence, on either side of the aircraft, deduces the components of the ground speed in the directions of sighting from the Doppler frequency variations affecting the ground clutter and reconstructs the ground speed vector from these components measured in the sighting directions. The fact of using several operations of sighting in different directions instead of only one sighting in the longitudinal axis of the aircraft makes it possible to overcome the effects of the drift in course due to cross-winds if any.

Figure 1:
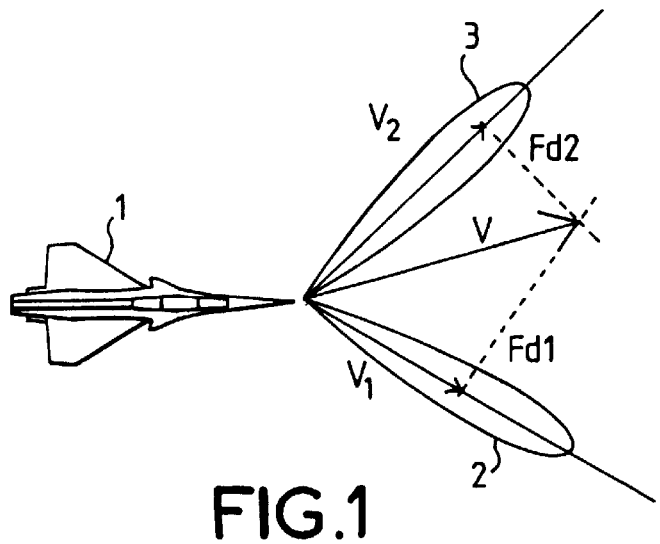
FIG. 1 illustrates the method of estimating the ground speed of an aircraft by means of an on board radar.

FIG. 1 illustrates the principle of the measurement of the ground speed vector by a radar on board an aircraft. The radar placed at the nose cone of the aircraft 1 carries out two lateral sightings of the ground at low incidence. During the first sighting operation, which is done, for example, on the right-hand side of the aircraft 1, at an azimuth $-\alpha_1$, the beam 2 of the radar illuminates a portion of the ground which returns an echo affected by a variation in Doppler frequency $F_{d1}$ related to the component V1 of the ground speed in the direction aimed at by the well-known relationship:

$$V_{1radar} = \frac{\lambda F_{d1}}{2}$$

where $\lambda$ is the wavelength of the wave emitted by the radar. During the second sighting operation, which is done on the left-hand side of the aircraft 1, at an azimuth $\alpha_2$, the beam 3 of the radar illuminates another portion of the ground which returns an echo affected by a variation in Doppler frequency $F_{d2}$ related to the component $V_2$ of the ground speed in the new direction of sighting by the relationship:

$$V_{2radar} = \frac{\lambda F_{d2}}{2}$$

A geometrical construction, simplified when the azimuths $-\alpha_1$ and $\alpha_2$ are taken to be equal to $-\pi/4$ and $+\pi/4$, is used to determine the modulus and orientation of the ground speed vector on the basis of its projections $V_1$ and $V_2$ in the azimuths $-\alpha_1$ and $\alpha_2$. The orientation of the ground speed vector is not obligatorily identified with the longitudinal axis of the aircraft 1 for there may be, as is shown in FIG. 1, a drift in course due to a cross-wind.

Figure 2A:
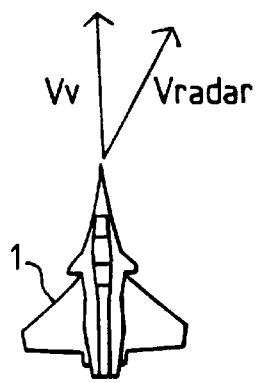
FIGS. 2a and 2b illustrate the behaviour of the error made on the estimation of the ground speed by the radar of an aircraft when this aircraft changes flight orientation.
Figure 2B:
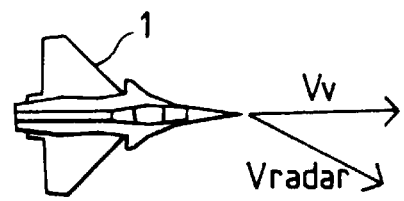

As can be seen in FIGS. 2a and 2b, if there is an angular error of referential matching of the radar with respect to the inertial unit such that the ground speed estimated by the radar $\vec{V}_{radar}$ does not have the same orientation as the true ground speed $V_v$, then this angular error of referential matching, since it is related to the referential system of the aircraft follows the progress of the aircraft. Thus if, as shown, the flight orientation of the aircraft 1 changes by 90° between FIGS. 2a and 2b, the ground speed vector estimated by the radar $\vec{V}_{radar}$ and the true ground speed vector $V_v$, also rotate by 90° in keeping the same angular divergence.

Figure 3A:
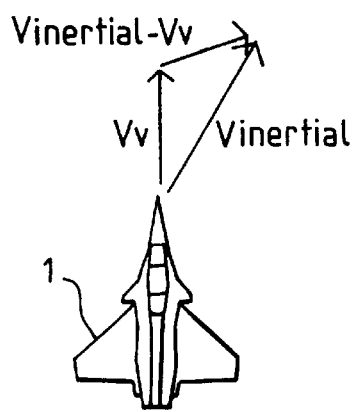
FIGS. 3a and 3b show the behaviour of the error carried out on the estimation of the ground speed by the inertial unit of an aircraft when this aircraft changes flight orientation.
Figure 3B:
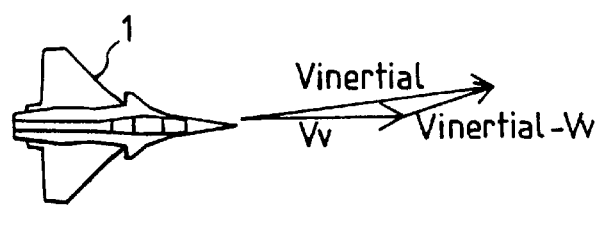

The inertial unit of the aircraft 1 gives a ground speed, in a referential system related to the aircraft 1, that is generally affected by an error or bias herein called a ground speed drift. This drift is independent of the progress of the aircraft as can be seen in FIGS. 3a and 3b. Thus if, as shown, the flight orientation of the aircraft 1 changes by 90° between FIGS. 3a and 3b, the true ground speed vector $V_v$ rotates by 90° but this is not longer precisely the case of the ground speed estimated by the inertial unit $\vec{V}_{inertial}$ which varies in such a way as to keep the ground speed drift $\vec{V}_{inertial} - V_v$ unchanged.

In short, it is observed that the difference between the ground speed $\vec{V}_{radar}$ estimated by the radar and the ground speed $\vec{V}_{inertial}$ estimated by the inertial unit, both these ground speeds being expressed in one and the same reference system related to the aircraft, has one component due to the drift of the inertial unit that does not vary with the changes in direction of the speed of the aircraft during a fairly brief maneuver and one component due to the error of referential matching of the radar with respect to the inertial unit that follows the changes in direction of the speed of the aircraft.

If we leave the measurement noises aside, the relationship between the ground speed $\vec{V}_{radar}$ estimated by the radar and the ground speed $\vec{V}_{inertial}$ estimated by the inertial unit can be expressed in the vector form:

$$\vec{V}_{inertial} = R\vec{V}_{radar} + \vec{B} \tag{1}$$

R being a matrix of rotational error that characterizes the defect of referential matching between the radar and the inertial unit and $\vec{B}$ being the drift in speed of the inertial unit. This relation (1) expresses the fact that the ground speed estimated by the radar in mode of determination of the speed differs from the ground speed estimated by the inertial unit firstly by the drift in speed $\vec{B}$ of the inertial unit and secondly by the referential matching error which corresponds to an error in change of reference expressed by the rotation matrix R.

Let $\phi$ be the referential matching error in terms of yaw, $\theta$ the referential matching error in terms of attitude et $\psi$ the referential matching error in terms of roll of the radar with respect to the inertial unit. Since these errors are small; it is possible to linearize the rotation matrix R and put it in the form:

$$R = \begin{pmatrix} 1 & -\phi & -\theta \\ \phi & 1 & -\psi \\ \theta & \psi & 1 \end{pmatrix}$$

If the ground speed $\vec{V}_{radar}$ estimated by the radar, the ground speed $\vec{V}_{inertial}$ estimated by the inertial unit and the drift in ground speed $\vec{B}$ of the inertial unit are expressed as a function of their components along the axes x, y et z of the reference trihedron related to the aircraft used by the inertial unit, the relationship (1) becomes:

$$\begin{pmatrix} V_{x\,inertial} \\ V_{y\,inertial} \\ V_{z\,inertial} \end{pmatrix} = \begin{pmatrix} 1 & -\phi & -\theta \\ \phi & 1 & -\psi \\ \theta & \psi & 1 \end{pmatrix} \times \begin{pmatrix} V_{x\,radar} \\ V_{y\,radar} \\ V_{z\,radar} \end{pmatrix} + \begin{pmatrix} B_x \\ B_y \\ B_z \end{pmatrix} \tag{2}$$

Given the fact that the aircraft never flies strictly with a horizontal attitude, the z components of the ground speeds estimated by the radar and by the inertial unit are not zero.

The relationship (2) may also be put in the form:

$$\begin{pmatrix} V_{x\,inertial} \\ V_{y\,inertial} \\ V_{z\,inertial} \end{pmatrix} =$$

$$\begin{pmatrix} 1 & 0 & 0 & 0 & -V_{z\,radar} & V_{y\,radar} \\ 0 & 1 & 0 & V_{z\,radar} & 0 & -V_{x\,radar} \\ 0 & 0 & 1 & -V_{y\,radar} & V_{x\,radar} & 0 \end{pmatrix} \times \begin{pmatrix} B_x \\ B_y \\ B_z \\ \psi \\ \theta \\ \phi \end{pmatrix} + \begin{pmatrix} V_{x\,radar} \\ V_{y\,radar} \\ V_{z\,radar} \end{pmatrix}$$

which shows that it is equivalent to a system of three linear equations with six unknown quantities. Two matrix equations of this type linking ground speed vectors estimated by the radar and the inertial unit in flight orientations that differ by a change in course and attitude are used to determine the six unknown quantities. However, to achieve a specified precision, it may be necessary to perform several maneuvers and achieve an optimal integration of the values of determination obtained. This integration may consist of a mean of the values of determination obtained weighted by the square of the standard deviation of the error when it is known.

In practice, a procedure of calibration comprises the following steps:
  the activation of the radar in mode of determination of the ground speed and the storage of the radar estimation,
  the storage of the value of the ground speed estimated by the inertial unit in synchronization with the radar,
  the performance of a maneuver by the aircraft;

a new activation of the radar in mode of determination of the ground speed and the storage of the pair of values of ground speed estimation by the radar and the inertial unit;

the determination of the errors of referential matching between the radar and the inertial unit and of the drift in ground speed of the inertial unit by the resolution of the system of linear equations coming from the implementation, twice, of the vector relationship (1), and in the event of insufficient precision, the reiteration of the preceding steps with integration of the values of determination.

The final precision is limited by the error or bias made by the radar on the measurement of the ground speed in the reference system of its antenna. It depends on the performance characteristics of the mode of estimation of the ground speed implemented in the radar.

However, for a ground speed of the order of 200 m/s, a change in course of 45 degrees and a drift in speed of the inertial unit of 0.1 m/s, it is possible to obtain a standard deviation of estimation on the referential matching error in terms of yaw equal to about 0.4 mrd, which is an appreciable gain in relation to the few milliradians of referential matching precision obtained on the ground by standard methods of harmonization.

The method of calibration that has just been described may be extended to the calibration of the operations of referential matching of the inertial unit with any device on board an aircraft for which the referential matching with respect to the radar can be assessed, for example the imaging devices whose referential matching with respect to the radar may be appreciated by comparing their images with those of the radar.

What is claimed is:

1. A method for calibrating positioning errors of a radar and of a drift in ground speed of an inertial unit on board an aircraft, comprising the steps of:

obtaining an estimation of the ground speed of the aircraft by the inertial unit $\vec{V}_{inertial}$ and by the radar $\vec{V}_{radar}$ in at least two different flight orientations;

using only the estimations to determine the drift in speed $\vec{B}$ and a rotation matrix R corresponding to the positioning errors of the radar with respect to the inertial unit based on a matrix relationship:

$$\vec{V}_{inertial} = R + i\vec{V}_{radar} + +i\vec{B}$$

applied for each of the flight orientations, wherein the ground speed and ground speed drift vectors being expressed by x, y and z components in a referential system related to the aircraft, and the matrix of rotation R being defined on the basis of the angles of positioning error in terms of yaw $\phi$, attitude $\theta$ and roll $\psi$ by a relationship:

$$R = \begin{pmatrix} 1 & -\phi & -\theta \\ \phi & 1 & -\psi \\ \theta & \psi & 1 \end{pmatrix}.$$

2. A method according to claim 1, wherein the two different flight orientations of the aircraft are obtained following maneuvers implying at least one change in course and attitude.

3. A method according to claim 1, comprising the following steps:

the activation of the radar in mode of determination of the ground speed and the storage of the radar estimation $\vec{V}_{radar}$, the storage of the value of the ground speed $\vec{V}_{inertial}$ estimated by the inertial unit in synchronization with the radar, the performance of a maneuver by the aircraft, a new activation of the radar in mode of determination of the ground speed and the storage of the new pair of values of ground speed estimation $\vec{V}_{radar}$ and $\vec{V}_{inertial}$ given by the radar and the inertial unit, and the determination of the errors of referential matching between the radar and the inertial unit and of the drift in ground speed $\vec{B}$ of the inertial unit by the resolution of the system of linear equations coming from the implementation, twice, of the vector relationship:

$$\vec{V}_{inertial} = R\vec{V}_{radar} + \vec{B}$$

R being a matrix of rotational error that characterizes the reference matching defect, defined on the basis of the angles of positioning error in terms of yaw $\phi$, attitude $\theta$ and roll $\psi$ by the relationship:

$$R = \begin{pmatrix} 1 & -\phi & -\theta \\ \phi & 1 & -\psi \\ \theta & \psi & 1 \end{pmatrix}$$

4. A method according to claim 3, implemented several times in succession, wherein a mean is taken of the various values of determination obtained for each error of referential matching of the radar with respect to the inertial unit and for the drift in ground speed of the inertial unit during the different repeated operations of implementation.

5. A method according to claim 3, implemented several times in succession, wherein a mean is taken of the various values of determination obtained for each error of referential matching of the radar with respect to the inertial unit and for the drift in ground speed of the inertial unit during the different repeated operations of implementation, weighted by the squares of their values of standard deviation.

* * * * *